Oct. 14, 1952     E. L. HOFFMANN ET AL     2,613,700

JIG SAW BLADE MOUNTING

Filed Oct. 10, 1950     2 SHEETS—SHEET 1

Inventors
Elmer L. Hoffmann
Allen L. Atkins
By J. Irving Silverman
Attorney

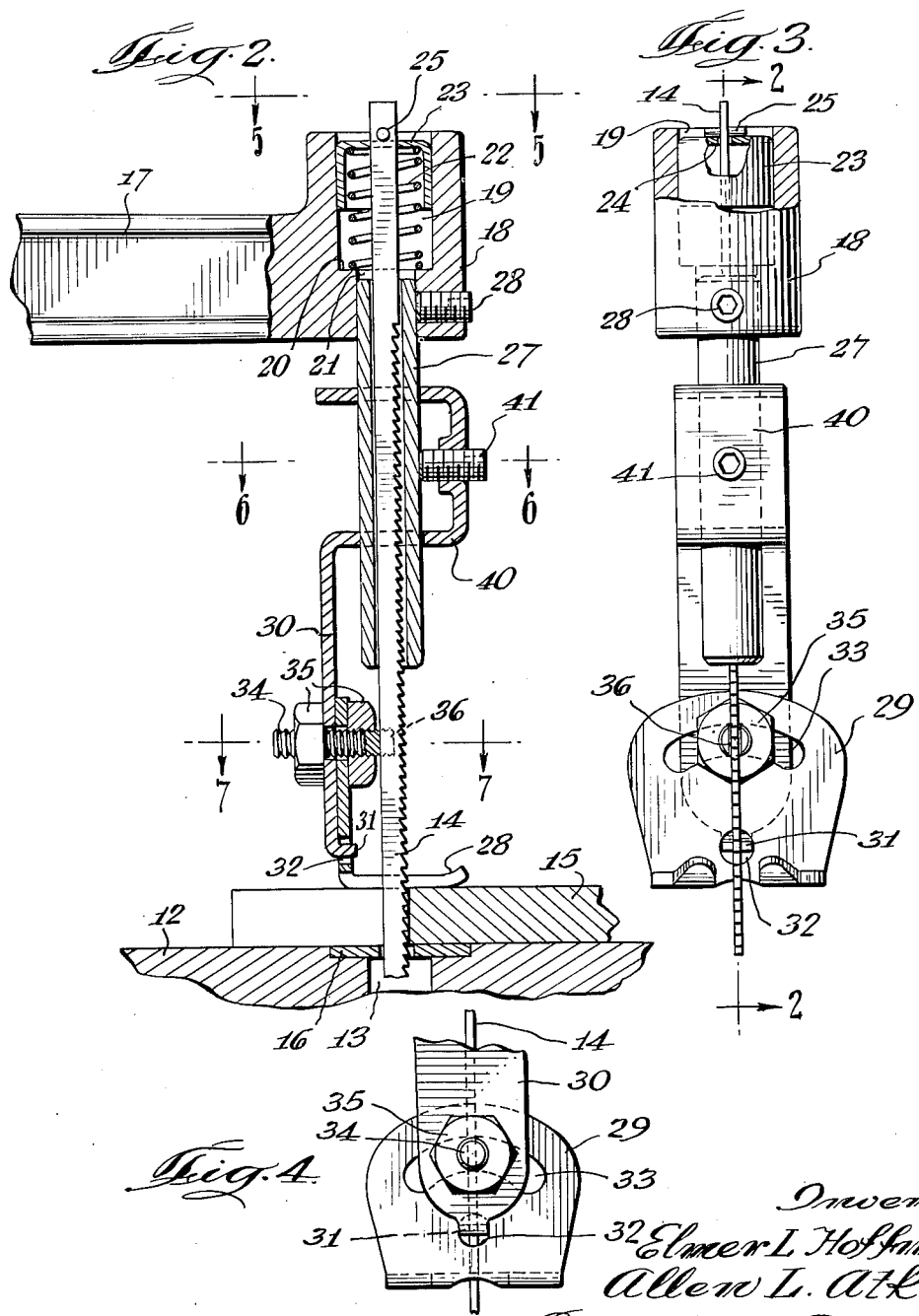

Patented Oct. 14, 1952

2,613,700

UNITED STATES PATENT OFFICE 2,613,700

JIG SAW BLADE MOUNTING

Elmer L. Hoffmann, Park Ridge, and Allen L. Atkins, Chicago, Ill.; said Hoffmann assignor to said Atkins Application October 10, 1950, Serial No. 189,408

4 Claims. (Cl. 143—73)

This invention relates generally to jig saws and particularly is concerned with the type of jig saw in which there is provided a reciprocating blade having one end connected to a source of reciprocating power and having the other or free end resiliently mounted. Specifically, the invention is directed to a novel construction of the resilient mounting of the free end of the blade.

The general type of jig saw with which the construction is intended to be used is well-known. Same consists of some kind of mount having a table with an opening through which the blade extends. The lower end of the blade is secured to a vertically reciprocable source of power. The upper end of the blade is secured to a spring. As the blade reciprocates, the spring keeps same tensed to prevent its buckling and to add power to the upward stroke, which in certain types of reciprocating power sources may be merely an idling movement. The type of jig saw contemplated is of extremely economical construction, intended to be sold to hobbyists and the like, including children. This jig saw is very small in size and uses the same size blade that is utilized in small hand held scroll saws, namely, about 1/8 inch in width.

Heretofore, the mountings for the jig saw blade have utilized leaf springs or have been formed of complicated expensive parts difficult to fabricate and maintain. The leaf springs lost their temper readily and broke frequently, and the other constructions increased the price of the jig saw.

An important object of this invention is to provide a mounting for a jig saw blade which is simple and efficient; which utilizes a minimum of easily formed, economical parts easily assembled; which completely enclose the free end of the blade and the return spring; and which is sturdy and durable.

Other objects of the invention are provide a mounting for an end of a jig saw blade which includes a novel saw blade guide; which has an adjustable guide foot removably secured thereto; and which has the saw blade end secured to a spring retaining member in a novel manner.

Certain objects lie in the combination of the elements of the mounting means with the saw arm and the construction of the arm to enable the mounting to be associated therewith.

Many other objects will appear as a description of the invention is made in connection with a preferred embodiment of the manner of carrying the same out. Such embodiment is illustrated and described in detail to further an understanding of the invention, such illustrations appearing in the accompanying drawings in which:

Fig. 2 is a sectional view through the saw blade mounting and the table of the jig saw on an enlarged scale taken on the line 2—2 of Fig. 3 and in the direction indicated.

Fig. 3 is a front elevational view of the saw blade mounting.

Fig. 4 is a rear elevational view of the lower portion of the saw blade mounting showing the guide foot construction.

Generally the invention resides in a construction in which the end of the saw arm which is poised over the saw table has a cylindrical recess which houses a coil spring held in place by a cup-shaped retainer. The upper end of the blade passes into the recess and is secured to the cup-shaped retainer. A guide which consists of a simple tube is in communication with the recess and the blade passes therethrough. This guide is removably mounted on the saw arm and serves as a shaft upon which the guide foot is adjustably mounted. The guide foot itself is adjustable to conform to the tilt of the table.

Figure 1:
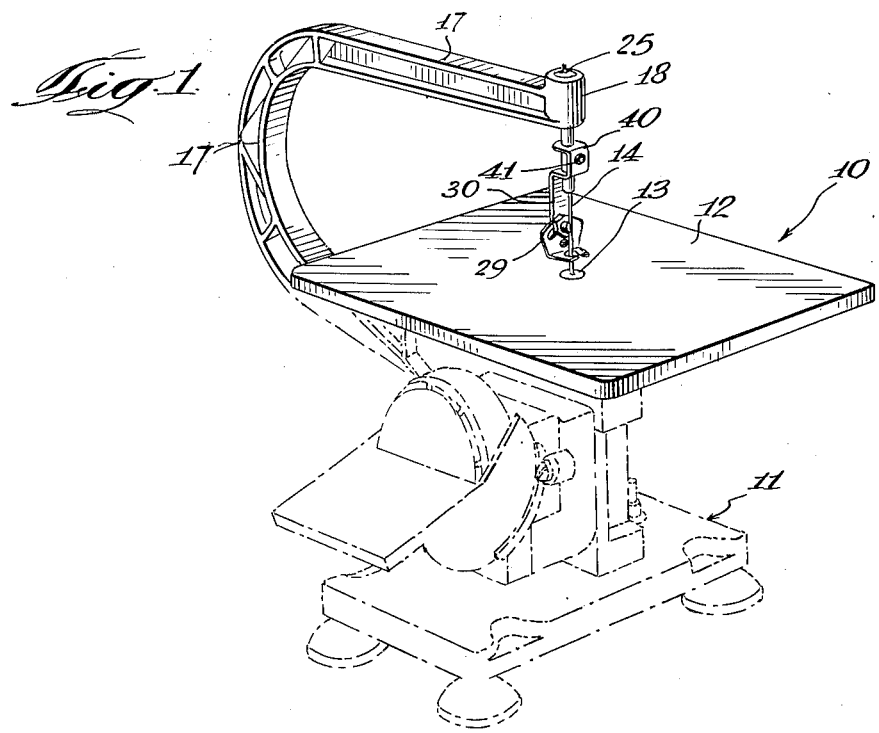
Fig. 1 is a perspective view of a jig saw having the invention applied thereto, the under portion of the same being shown in phantom lines.
Figure 5:
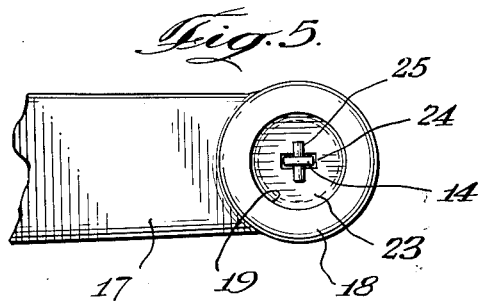
Fig. 5 is a top plan view of the mounting.
Figure 6:
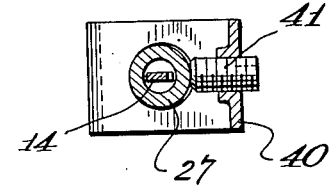
Fig. 6 is a sectional view taken along the line 6—6 of Fig. 2 and in the indicated direction.

Referring now to the details of the invention, there is illustrated in Fig. 1 a jig saw 10 of the highly portable type. The nether portion 11 is shown in phantom lines and same may consist of any manner of standard, motor, etc., the exact nature of which is immaterial to the invention. The jig saw has a table 12 which may be tiltable to enable angular cuts to be made, and an opening 13 is provided in the center of the table through which the blade 14 extends. The lower end of the blade 14 is attached in some manner to a source of reciprocating power (not shown) which moves the blade up and down in the process of sawing or filing (in the case the blade has an abrasive thereon) a member such as shown at 15 in Fig. 2. The reference character 16 indicates a replaceable wear insert of conventional construction.

Figure 8:
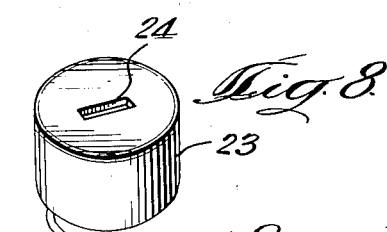
Fig. 8 is a perspective view of the coil spring retaining cup.

This is secured to the saw 10 a large C-shaped arm 17 which has the free end thereof extending over the table top and provided with a cylindrical portion 18 having therein an upwardly opening cylindrical socket or recess 19 formed with a shoulder 20 on the bottom thereof. The axis of the socket 19 is aligned with the center of the opening 13 so that the upper end of the saw blade 14 extends into the socket 19 through an opening 21 in the bottom thereof. The socket 19 houses a coil spring 22 which surrounds the saw blade 14 and rests on the shoulder 20. The free end of the blade 14 is secured to an inverted cup-shaped spring retaining member 23 which reciprocates vertically within the socket 19 during the reciprocation of the blade 14, alternately compressing and releasing the coil spring 22. The end of the member 23 has a slot 24 (see Fig. 8) through which the free end of the blade extends. A small pin 25 passing through the blade end prevents the blade from being pulled through the member 23.

Obviously this is a simple arrangement and one which requires practically no effort to assemble. There are no fastenings, clamps, or other means requiring expensive operations to arrange and adjust. The coil spring 22 is completely enclosed and any danger of catching in clothes or hair is eliminated.

Figure 7:
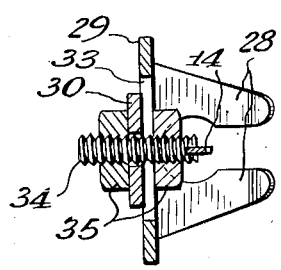
Fig. 7 is a sectional view taken through the mounting along the line 7—7 and in the indicated direction.

There is an elongate section of tubing 27 set into the opening 21, protruding from the bottom thereof and removably held in place by the set screw 28. The blade 14 passes through the tube which serves to guide the same. The section of tubing 27 supports thereon a bi-furcated guide leg 28 between the bifurcations of which the blade 14 passes as shown in Figs. 2, 3, and 7. The leg 28 is integrally formed with a vertically arranged pivot plate 29 pivotally mounted on the arm 30. There is a projection 31 at the lower end of the arm which engages an opening 32 of the plate 29, the cooperation of the projection and opening serving as the pivot point. The upper portion of the plate 29 has an arcuate slot 33 whose radial center is the opening 32. The bolt 34 and nuts 35 hold the plate 29 to the leg 30. The bolt 34 is slotted at 36 to guide the blade 14. The arm 30 has a collar portion 40 integrally formed therewith and engaging the tubular member 27 to be slidable therealong, and having a set screw 41 to enable same to be positioned at any desired height above the table 12.

Obviously, the plate 29 may be pivoted to any desired angle to arrange the bifurcated guide leg 28 parallel to the surface of the table 12, and may be secured in that position. Likewise, the guide foot may be adjusted to any desired height above the table by sliding the collar 40 along the tubular member 27 and fastening same in position by set screw 41. Note that the entire assembly of the guide foot and its supporting parts are secured to the tubular member 27 and the same is secured to the portion 18 by a single set screw 28. The great simplicity of the entire construction should be immediately apparent.

It is believed that this invention, its mode of construction and assembly, and many of its advantages should be readily understood from the foregoing without further description, and it should also be manifest that while a preferred embodiment of the invention has been shown and described for illustrative purposes, the specific details are nevertheless capable of wide variations within the purview of this invention as defind in the appended claims.

What is claimed and desired to be secured by Letters Patent of the United States is:

1. In combination with a reciprocating saw having a table and an arm arranged above said table, said arm having socket in the end thereof, a coil spring disposed in said socket, means associated with said spring having the blade of said saw secured thereto whereby to reciprocate with the blade alternately to compress and release said spring thereby to provide a resilient mounting for said blade, said means comprising a cup-shaped spring retaining member adapted to house said spring, said sprocket having an opening in bottom thereof in which said blade is adapted to reciprocate, said member adapted to reciprocate freely in said socket.

2. In combination with a reciprocating saw having a table and an arm arranged above said table, said arm having a socket in the end thereof, a coil spring disposed in said socket, mounting means secured to the blade of the saw having one end of said spring housed therein, said means being adapted to reciprocate with the blade whereby alternately to compress and release said spring, a guide tube secured to said arm, said tube communicating with and axially aligned with said socket and adapted to receive said blade therethrough and an adjustable guide foot for said blade removably mounted on said tube.

3. In combination with a reciprocating saw having a table and an arm arranged above said table, said arm having a socket in the end thereof, a coil spring disposed in said socket, mounting means secured to the blade of the saw having one end of said spring housed therein, said means being adapted to reciprocate with the blade whereby alternately to compress and release said spring, a guide tube secured to said arm, said tube communicating with and axially aligned with said socket and adapted to receive said blade therethrough and an adjustable guide foot for said blade removably mounted on said tube, said means comprising an inverted cup-shaped member having said blade secured thereto, said socket opening upwardly and having an opening in the bottom through which said blade extends.

4. In combination with a reciprocating saw having a table and an arm arranged above said table, said arm having a socket in the end thereof, a coil spring disposed in said socket, mounting means secured to the blade of the saw having one end of said spring housed therein, said means being adapted to reciprocate with the blade whereby alternately to compress and release said spring, a guide tube secured to said arm, said tube communicating with and axially aligned with said socket and adapted to receive said blade therethrough and an adjustable guide foot for said blade removably mounted on said tube, comprising a bifurcated guide leg member having said blade passed through the bifurcations thereof, said member being pivotally mounted for adjustment on a horizontal axis above said table.

ELMER L. HOFFMANN.
ALLEN L. ATKINS.

REFERENCES CITED

The following references are of record in the file of this patent:

UNITED STATES PATENTS

| Number | Name | Date |
| --- | --- | --- |
| 1,270,285 | Good | June 25, 1918 |
| 2,542,373 | Tollafield | Feb. 20, 1951 |

FOREIGN PATENTS

| Number | Country | Date |
| --- | --- | --- |
| 411,927 | Great Britain | June 21, 1934 |